United States Patent
Tavis

[11] 3,837,227
[45] Sept. 24, 1974

[54] LINEAR TRANSDUCER SYSTEM
[75] Inventor: John R. Tavis, Mariposa, Calif.
[73] Assignee: Tavis Corporation, Mariposa, Calif.
[22] Filed: Nov. 9, 1973
[21] Appl. No.: 414,518

Related U.S. Application Data
[63] Continuation-in-part of Ser. No. 225,456, Feb. 11, 1972, abandoned.

[52] U.S. Cl.................. 73/398 R, 73/393, 323/75 S
[51] Int. Cl. ............................................. G01i 9/10
[58] Field of Search................ 73/393, 398 R, 88.5; 336/30; 323/75 S; 324/132

[56] References Cited
UNITED STATES PATENTS
3,646,815   3/1972   Martin .................................. 73/393

*Primary Examiner*—Donald O. Woodiel
*Attorney, Agent, or Firm*—Christie, Parker & Hale

[57] ABSTRACT

Transducing means senses a variable physical parameter and forms a variable impedance element having an impedance that varies as a function of variations in the physcial parameter. An impedance element is connected in series with the variable impedance to define a network having an input-to-output voltage-signal transmission characteristic that is a non-linear function of variations in the physical parameter. A circuit arrangement responsive to a reference signal and the output signal of the network controls the input signal so that a voltage signal developed across one of the impedance elements has a predetermined magnitude that is substantially unaffected by either variations in the variable impedance or the output signal. The output signal of the network provides a linear indication of variations in the physical parameter. In a preferred arrangement, a coil in a variable-reluctance pressure transducer has an impedance, the magnitude of which is a reciprocal function of variations in ambient pressure acting against a diaphragm. A circuit applied across the coil a sinusoidal voltage that has a predetermined magnitude. A demodulator circuit coupled to the coil provides a direct current signal which indicates how much pressure is acting against the diaphragm.

10 Claims, 3 Drawing Figures

LINEAR TRANSDUCER SYSTEM

CROSS-REFERENCE TO RELATED APPLICATION

This is a continuation-in-part of my copending application Ser. No. 225,456, filed Feb. 11, 1972 and entitled LINEAR TRANSDUCER SYSTEM, now abandoned.

BACKGROUND OF THE INVENTION

1. Field of the Invention

This invention relates to transducer systems.

2. Description of the Prior Art

It is often desired in instrumentation and control systems to have available an electrical signal, the magnitude of which is related to the value of some physical parameter such as air pressure, temperature, and the like. The electrical signal can be used to drive a recorder so that a record can be made of variations in the sensed parameter and can also be used as a control signal within an overall process control system. To this end, various types of transducer systems have been developed which include various types of transducing means such as variable-reluctance pressure transducers, strain gauges, and the like.

The transducing means each have a transducer parameter which changes in magnitude relative to a reference value responsive to variations in the physical parameter being sensed. For example, in one arrangement known as a single-active-arm variable-reluctance pressure transducer, the transducer parameter is an air gap or spacing between a flexible diaphragm and a magnetic core element. The diaphragm moves toward or away from the core element responsive to changes in pressure, preferably in a linear relationship. An electrical coil is wrapped around the core member and has an impedance which is a function of the magnetic reluctance of a magnetic circuit formed by the core, the air gap and the diaphragm. The electrical coil can be arranged in series circuit relationship with a constant inductance coil and when the resulting circuit is driven by an oscillating voltage, an output signal is developed at the common node of the two coils, the magnitude of the output signal being a function of the pressure acting against the diaphragm. In order to provide an output signal which is null at a desired reference pressure, a bridge circuit can be employed which is balanced when the electrical coil has a predetermined impedance.

While a single-active-arm variable-reluctance transducer has many advantageous features, its usefulness has not been fully realized because the output signal it produces is a nonlinear rather than a linear function of pressure. There are several causes of this non-linearity. Most of these causes such as non-linearity of the movement of the diaphragm as a function of pressure are relatively minor compared with the principal cause. The principal cause resides in the non-linear reciprocal relationship between coil inductance and air gap. The following equation describes this non-linear functional relationship for a bridge circuit including a single-active-arm variable-reluctance transducer:

$$E = V [ \pm \Delta g_o/(4g_o - 2\Delta g_o) ]$$

wherein E is the bridge output voltage magnitude; the sign or polarity of E depending upon which terminal of the bridge is a reference terminal; V is the bridge input voltage magnitude; $g_o$ is the nominal air gap at which the bridge is nulled; and $\Delta g_o$ is the change in the air gap from the nominal air gap; $\Delta g_o$ being proportional to the pressure acting against the diaphragm, and being positive for movement of the diaphragm toward the core so as to decrease the air gap.

A numerical example, given below, illustrates the effects of the principal cause of non-linearity incident to a single-active-arm arrangement.

Assume for the numerical example that the transducer system is designed to handle pressures having a range from say, 1,000 psi to 9,000 psi wherein it is desired to indicate the amount of pressure change from a nominal pressure of say, 5,000 psi. In designing a variable-reluctance transducer circuit element for the specific example, the diaphragm would be designed to provide a nominal air gap $g_o$ at 5,000 psi and to provide a ±20% change $\Delta g_o$ responsive to a full scale change from 1,000 psi to 9,000 psi.

As discussed above, a bridge circuit including a single-active-arm variable-reluctance transducer as a circuit element is characterized by the following equation:

$$E = V [ \Delta g_o/(4g_o - 2\Delta g_o) ]$$

Equivalently, this equation can be expressed as:

$$E/V = r/(4 + 2r)$$

where $$r = \Delta g_o/g_o$$

Consider now the gain (E/V) at full scale pressure wherein the air gap is changed by 20 percent (i.e. $r = 0.2$). Using the value 0.2 for $r$ yields a gain (E/V) of 0.056. Consider next the gain (E/V) at one-half full scale pressure wherein the air gap has changed by 10 percent (i.e. $r = 0.1$). Using the value 0.1 for $r$ yields a gain (E/V) of 0.026. For ideal linearity, the midpoint gain or gain at one-half of full scale should be one-half the gain at full scale pressure (i.e. 0.055/2 = 0.028).

Thus the non-linearity at the midpoint expressed as a percentage of full scale is given by 0.028 − 0.026/(0.055) = 3.6% F.S.

Such a 3.6 percent non-linearity is generally unacceptable for a precision transducer system.

Generally, in instrumentation and control systems it is preferred to have available an electrical signal that is linearly proportional to the physical parameter being sensed. Consequently, in prior art pressure transducer systems, an arrangement known as a double-active-arm variable-reluctance pressure transducer has been resorted to. In the double-active-arm arrangement, a pair of magnetic core elements, each having an E-shape in cross section, are spaced-apart in a facing relationship giving the appearance of a block 8. A flexible diaphragm in the spacing between the pair moves toward one core and simultaneously moves away from the other core responsive to pressure acting against the diaphragm.

Each core has its own electrical coil wound around it, and the coils are connected in a bridge circuit. A constant-amplitude sinusoidal voltage is applied across the bridge circuit. Responsive to the pressure, the inductance of one coil is relatively high while the inductance of the other coil is relatively low. Thus the portion of the applied voltage existing across each coil varies with the pressure, and, at the junction of the two coils there is developed an electrical output signal which is substantially linearly proportional to the pressure. While the double-active-arm arrangement offers the advantage of linearity, it is in most other respects a less desirable arrangement than the single-active-arm arrangement. The principal reason why it is less desirable resides in the fact that magnetic core elements are on both sides of the flexible diaphragm. Thus in the double-active-arm arrangement, a magnetic core element is in the way of and blocking to some extent the pressure acting against the diaphragm on either side of the diaphragm. In contrast, in the single-active-arm arrangement, there is no magnetic core on one side of the diaphragm and clearance is provided for the full diaphragm surface area on that side. Often, a pressure transducer is exposed to a contaminated environment. In the double-active-arm arrangement, one of the cores can be sealed, but the other core will be directly exposed to the contaminated environment and dirt, etc. may collect on it. Cleaning is a problem because it is somewhat difficult to get access to the core and the diaphragm in the double-active-arm arrangement. Moreover, in circumstances wherein relatively high pressures are developed in the environment, the coil wrapped around the exposed core will be affected by the high ambient pressure and may flex or be displaced in some manner. For this reason the coil impedance will change in an arbitrary, unpredictable manner. Preferably, of course, the coil impedance should be functionally dependent on the displacement of the diaphragm only.

SUMMARY OF THE INVENTION

The apparatus of this invention includes transducing means sensing a variable physical parameter and forming a variable impedance element having an impedance that varies as a function of variations in the physical parameter. An impedance element is connected in series with the variable impedance element to define a network having an input-to-output voltage-signal transmission characteristic that is a non-linear function of variations in the physical parameter.

The present invention radically departs from prior art approaches to eliminating non-linearity in transducer systems wherein double-active-arm arrangements are employed. In such arrangements, the voltage signals existing across two variable impedances vary in opposite directions. In contrast, the present invention includes circuit means applying across the network an input signal of such a magnitude that a voltage signal developed across one of the series-connected impedance elements has a predetermined magnitude that is substantially unaffected by either variations in the variable impedance or in the output signal. As a result, the output signal of the network provides a linear indication of variations in the physical parameter.

Thus an embodiment of this invention in a variable-reluctance pressure transducer has the advantages of the single-active-arm arrangement such as simplicity, ease of access to the movable diaphragm, etc., as well as the advantage of linearity as in the double-active-arm arrangement.

In a preferred embodiment, a feedback arrangement is responsive to an oscillating voltage developed at one terminal of the coil of a variable-reluctance transducer and to a reference signal to apply across the coil a constant-frequency sinusoidal voltage signal that remains constant even though the oscillating voltage varies in amplitude and phase. The feedback arrangement includes a phase-sensitive demodulator circuit that converts the oscillating signal into a direct-current signal serving as an indication of ambient pressure acting against the diaphragm.

DETAILED DESCRIPTION

Figures 1, 2:
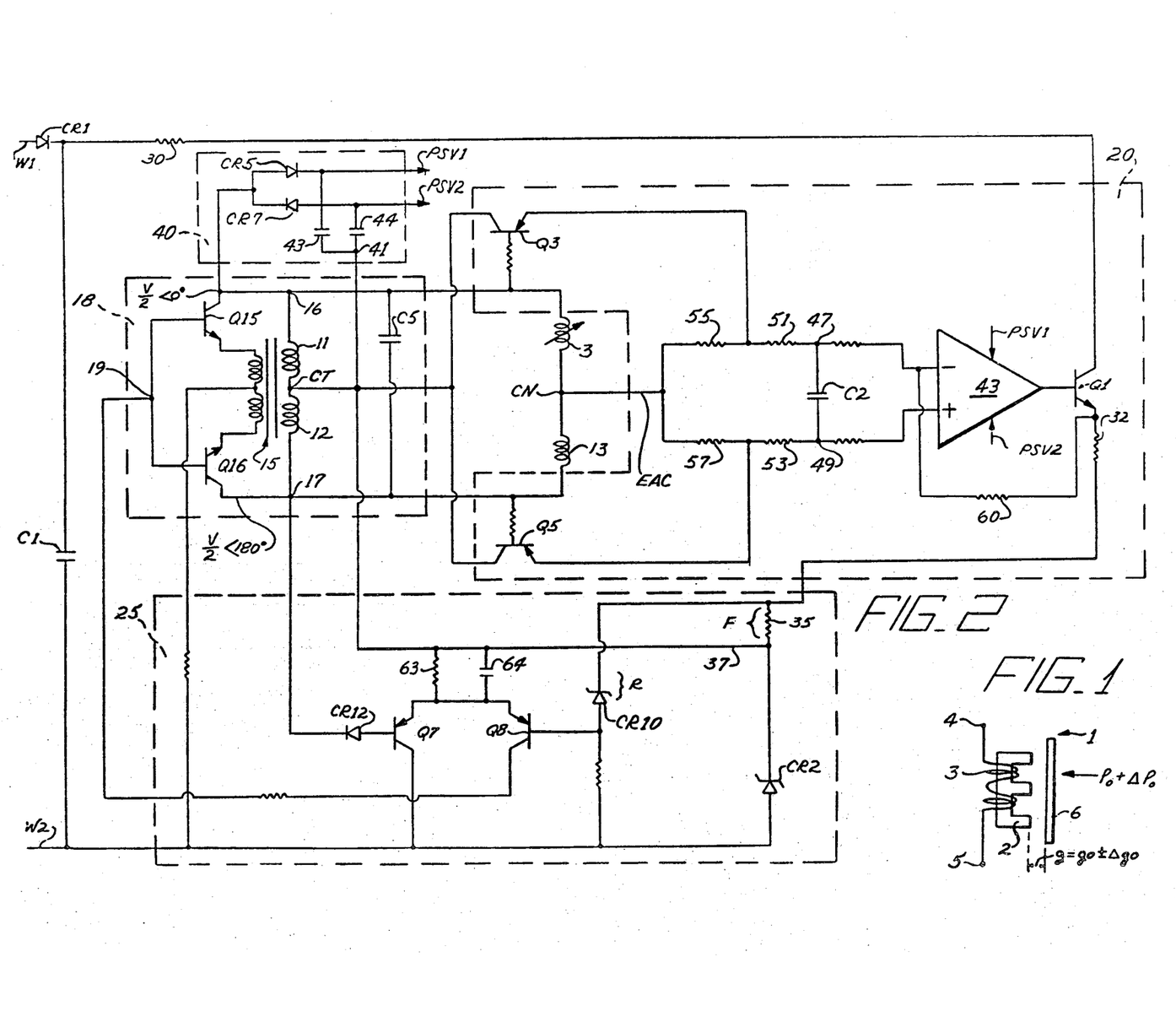
FIG. 1 is a sketch illustrating the construction of a variable-reluctance pressure transducer used in the preferred embodiment of this invention.
FIG. 2 is an electrical schematic of a first embodiment of this invention.

In FIG. 1, a variable-reluctance pressure transducer indicated generally at 1 includes an E-shaped magnetic core 2 having electrical coil 3 wrapped around it. The coil has opposite end terminals 4 and 5. A diaphragm 6 is supported by means not shown adjacent to the magnetic core. The spacing or air gap between the diaphragm and the core is identified as $g$. The symbol $g_o$ refers to the width of the air gap existing at a reference pressure $P_o$. The symbol $\Delta g_o$ refers to the amount of change in the width of the air gap from $g_o$ caused by a change $\Delta P_o$ the ambient pressure, and $\Delta g_o$ is a positive number for narrower than nominal widths of the air gap.

The inductance of the coil 3 is determined by the number of its turns and by the total magnetic reluctance of the magnetic circuit formed by the core, the air gap, and the diaphragm. The magnetic reluctance of the air gap is so much greater than the magnetic reluctance of the core and the diaphragm that the total magnetic reluctance is almost the same as the magnetic reluctance of the air gap alone. Consequently, the magnetic reluctance of the core and the diaphragm have practically no effect on the inductance, and can be neglected.

The coil 3 has an inductive reactance $X_t$ or impedance which for any given frequency of oscillation is given by the equation:

$X_t = k/(g_o - \Delta g_o)$ wherein $k$ is a numerical constant depending upon the number of turns, etc.

Thus the impedance of coil 3 is a hyperbolic function of the pressure acting against the diaphragm and controlling the width of the air gap. It should be noted that whether the coil impedance increases or decreases responsive to an increase in pressure depends upon whether the increase in pressure causes the air gap to narrow or widen. In either event, the coil impedance is said to vary in a reciprocal relationship with pressure because the product of coil impedance and the net air gap is equal to a constant irrespective of whether the pressure acts to narrow or to widen the air gap.

The present invention is directed to a circuit arrangement for providing an indicating signal that varies in a linear relationship rather than a non-linear relationship.

Consider now the effect of applying across the two terminals 4 and 5 a constant-frequency sinusoidal voltage $V_c$ having a predetermined magnitude that is substantially unaffected by variations in either the coil impedance $Z_t$ or the indicating signal. Thus the current $I_c$ flowing through the coil is given by the equation:

$I_c = V_c/Z_t = (V_c/k)(g_o - \Delta g_o)$

From the latter equation it can be seen that, under the foregoing conditions, the current $I_c$ flowing through the coil varies in a linear relationship with the pressure acting against the diaphragm. In accordance with the present invention, circuit means provide the indicating signal in accordance with the variations in the current flowing through the coil and therefore the indicating signal provided is linear.

FIG. 2 is a schematic diagram of a first embodiment of a single-active-arm, variable-reluctance transducer system in accordance with this invention.

The variable-reluctance transducer forms variable inductor 3 and is one circuit element in a bridge circuit arrangement of coil windings 11 and 12, fixed inductor 13, and the variable inductor 3.

Coil windings 11 and 12 form the secondary winding of a transformer 15 and have a center tap CT and terminals 16 and 17. A sine-wave oscillator 18 includes the transformer 15 as one of its elements. Sine-wave oscillator 18 is responsive to a D.C. current signal supplied to it at terminal 19 to produce across the secondary windings a sinusoidal voltage V having a magnitude proportional to the magnitude of the current signal. At terminal 16 of coil winding 11 and also at terminal 17 of coil winding 12, the magnitude of the voltage produced is one-half that of the voltage V and the two voltages are 180° out of phase.

Variable inductor 3 and fixed inductor 13 are connected in series to define a network having a common node CN. In operation a voltage EAC is developed between common node CN and the center tap CT whenever the inductive reactance of variable inductor differs from the inductive reactance of fixed inductor 13.

An equation for the voltage EAC can be derived as follows:
$EAC = V/2 \; \underline{/180°} + (I) \; k/g_o$
where $(k/g_o)$ is the inductive reactance of fixed inductor 13 and I is the current flowing through it. Furthermore:

$$EAC = \frac{V}{2} \underline{/180°} + \frac{\left(\frac{V}{2}\underline{/0°} - \frac{V}{2}\underline{/180°}\right)}{\frac{k}{g_o - \Delta g_o} + \frac{k}{g_o}} \left(\frac{k}{g_o}\right)$$

Simplifying:
$EAC = [-V (\Delta g_o)]/[4g_o - 2\Delta g_o]$;
where the minus sign indicates that EAC is 180° out of phase with $V \; \underline{/0°}$ when $\Delta g_o$ is positive.

An equation for the voltage $V_T$ across the variable inductor 3 can be similarly derived and is as follows:
$V_T = V [g_o/2g_o - \Delta g_o]$ In accordance with the present invention, the voltage V is so controlled by a feedback arrangement that the magnitude of $V_T$ is maintained substantially constant. To this end, the bridge input voltage V is so controlled that its magnitude is given by the equation:
$V = R [2g_o - \Delta g_o]/2g_o$
where R is a constant reference signal. From the latter two equations, it can be seen that the voltage $V_T$ remains constant and is equal to R/2. Furthermore, since $EAC = [-V (\Delta g_o)] [4g_o - 2\Delta g_o]$
and $V = R [2g_o - \Delta g_o]/2g_o$,
it follows that
$EAC = [- \Delta g_o (R)]/4g_o$,
which shows that EAC varies linearly with $\Delta g_o$.

The appropriate amount of feedback gain $K_F$ is determined as follows:
$V = R + K_F EAC$
$R [2g_o - \Delta g_o]/2g_o = R + K_F \cdot (-\Delta g_o/4g_o) \cdot R$
$4Rg_o - 2R\Delta g_o = 4Rg_o - K_F \Delta g_o R$
$K_F = 2$ Briefly, the feedback arrangement includes a phase-sensitive demodulator circuit 20 producing a feedback signal F, the sine-wave oscillator 18, and a control circuit 25 which is responsive to the feedback signal F and which controls the amplitude of the oscillation produced by the sine-wave oscillator 18.

The arrangement of the control circuit 25 and the sine-wave oscillator 18 embodies an invention disclosed and claimed in my co-pending application Ser. No. 3,308, filed Oct. 1, 1971 entitled AMPLITUDE STABILIZED OSCILLATOR CIRCUIT, now U.S. Pat. No. 3,763,444 issued Oct. 2, 1973.

The transducer system shown in FIG. 2 is of the two-wire type wherein analog information is provided in the form of the amount of current flowing between the two wires. These two wires are identified in FIG. 2 as W1 and W2.

In a two-wire system the actual voltage levels applied to the two wires (by external source) is of no particular significance. However, for convenience of description it is useful to assign typical operating voltage levels. Thus, the values +9VDC at wire W1 and −9VDC at wire W2 are selected as voltage levels in the following description.

A capacitor C1 and a diode CR1 are connected in series between the wires W1 and W2, with diode CR1 being forward-biased. Capacitor C1 serves as a high-frequency filter to smooth out the voltage presented to the rest of the circuitry in the system.

The major portion of the current flowing between the wires W1 and W2 flows from the diode CR1, through a series-circuit path comprising resistor 30, an N-P-N transistor Q1 and resistor 32 in the demodulator 20, and a resistor 35 and Zener diode CR2 in the control circuit 25, and out to the wire W2.

The Zener diode CR2 has a substantially constant 9 volt drop and has its anode connected to wire W2 and its cathode connected to a wire 37. Thus the voltage level on wire 37 is fixed relative to the voltage level presented on wire W2 and in the example described is ground or 0 volts DC.

The wire 37 is connected to various circuit elements so as to provide thereto the ground level. The center tap CT of windings 11 and 12 is connected to wire 37. A power supply 40 has a terminal 41 connected to wire 37. Power supply 40 provides power supply voltages PSV1 and PSV2 by wires not shown to a conventional operational amplifier circuit 43 in the demodulator 20. A diode CR5 in the power supply 40 rectifies the sine-wave voltage developed at terminal 16 of winding 11 to produce voltage PSV1 which is positive relative to the voltage at wire 37. A capacitor 43 connected between the cathode of the diode CR5 and wire 37 smooths out the rectified voltage PSV1. Another diode CR7 in the power supply 40 rectifies the same sine-wave voltage to produce voltage PSV2 which is negative relative to the voltage at wire 37. A capacitor 44 connected between the anode of the diode CR7 and the wire 37 smooths out the rectified voltage PSV2.

The demodulator 20 has two chopper transistors Q3 and Q5 which are of the P-N-P type. The collectors of Q3 and Q5 are connected together and to the wire 37. The base of Q3 is resistively coupled to terminal 16 of winding 16. Thus for each half-cycle of the sine-wave signal V when terminal 16 is negative, the collector-base junction of Q3 is forward-biased to saturate Q3. On the other hand, for each half-cycle when terminal 16 is positive, the collector-base junction of Q3 is reversed biased and Q3 does not conduct. Thus chopper transistor Q3 operates in what is called the inverted-connection mode whereby relatively low saturation-offset voltages are obtained. Chopper transistor Q5 is also operated in the inverted-connection mode and is turned on and off on alternate half-cycles responsive to the voltage produced at terminal 17 of coil winding 12.

The demodulator 20 has a capacitor C2 connected between terminals 47 and 49 and serving as a low-pass filter. A resistor 51 is connected between terminal 47 and the emitter of Q3. A resistor 53 is connected between terminal 49 and the emitter of Q5. The demodulator 20 receives the voltage EAC which is coupled to the emitters of Q3 and Q5 through resistors 55 and 57 respectively.

During a half-cycle when chopper transistor Q3 is switched into conduction, its emitter is approximately 0 volts, and at the same time the voltage EAC is resistively coupled to capacitor C2 at terminal 49. During the next half-cycle, chopper transistor Q5 is switched into conduction so that its emitter is approximately 0 volts, and at the same time the voltage EAC is resistively coupled to capacitor C2 at terminal 47. Thus, during a half-cycle wherein EAC has one polarity, EAC is coupled to one end of capacitor C2 and during the next half-cycle wherein EAC has the opposite polarity, EAC is coupled to the opposite end of capacitor C2. Consequently, capacitor C2 is charged up to develop a substantially constant voltage the magnitude of which is directly proportional to the magnitude of the voltage EAC, and the polarity of which depends upon the phase of the voltage EAC relative to the voltages of terminals 16 and 17.

Terminal 47 is resistively coupled to the inverting terminal of the operational amplifier 43, and terminal 49 is resistively coupled to the non-inverting terminal. The output terminal of the operational amplifier is connected to the base of transistor Q1 which acts as an emitter follower.

Gain stabilization for the operational amplifier 43 is provided by a circuit which includes the emitter follower and a resistor 60 connected between the emitter of Q1 and the inverting terminal of the operational amplifier.

In operation, demodulator 20 develops across a resistor 35, which is connected between the wire 37 and the junction of diode CR10 and R32, a feedback signal F which varies in accordance with the variations in the voltage EAC. Thus as the pressure acting against the diaphragm increases the feedback signal F also increases. As the voltage across resistor 35 increases, the current which flows through it and from wire W1 to wire W2 also increases. It is this variation in current flowing through resistor 35 and between wires W1 and W2 which provides the information concerning the pressure acting against the diaphragm.

Control circuit 25 is responsive to the current flowing through resistor 35 to control sine-wave oscillator 18 so as to provide the appropriate voltage V to the bridge circuit so as to linearize the output current with respect to variations in pressure.

Control circuit 25 includes a Zener diode CR10 which provides a substantially constant voltage R such as 6.0 VDC. Zener diode 10 has its cathode connected to the wire 37 and has its anode resistively coupled to wire W2. A differential amplifier circuit arrangement in the control circuit 25 senses the difference in voltage between the reference voltage R and the voltage F developed across the resistor 35. Transistors Q7 and Q8 in the differential amplifier have their emitters connected together. A resistor 63 and a parallel capacitor 64 are connected between the wire 37 and the emitters of Q7 and Q8. The base of Q8 is connected to the anode of CR10 and the collector Q8 is resistively coupled to the terminal 19 of the sine-wave oscillator 18. A diode CR12 has its anode connected to the base of Q7 and its cathode connected to terminal 17 of winding 12. The collector of Q7 is connected to the wire W2.

Diode CR12 responds to the sine-wave voltage developed at terminal 17 and develops at the base of Q7 a half-wave rectified sine-wave. Responsive to this half-wave rectified sine-wave, Q7 conducts and draws its emitter current through resistor 63. Consequently, the voltage at the emitters of Q7 and Q8 is negative relative to the voltage at wire 37 (0 volts in this example). Capacitor 64 serves to smooth out variations in this voltage.

The amount of collector current flowing through Q8 and provided to terminal 19 of oscillator 18 depends upon the voltage existing between the base of Q8 and wire 37. From FIG. 2 it can be seen that a series circuit path exists from the base of Q8 through Zener diode CR10 and resistor 35 to wire 37. As the voltage developed across resistor 35 increases the net voltage existing between the base of Q8 and the wire 37 decreases. On the other hand, as the voltage developed across resistor 35 decreases, the net voltage existing between the base of Q8 and wire 37 increases. In turn, the collector current of Q8 varies in accordance with the variations in the voltage at the base of Q8.

Sine-wave oscillator 18 includes transistors Q15 and Q16. Terminal 19 is connected to the base of Q15 and to the base of Q16. The collector of Q15 is connected to terminal 16 and the collector Q16 is connected to terminal 17. A center-tapped primary winding of transformer 15 is connected between the emitters of Q15 and Q16 and the center tap is resistively coupled to wire W2. The capacitor C5 is connected between terminals 16 and 17 to provide tuning for the sine-wave oscillator.

The individual circuit values for the various components used in the circuitry of FIG. 2 is a matter of design choice. However, in order to achieve linearity, it is important to select the appropriate overall gain for the demodulator 20, the control circuit 25, and the sine-wave oscillator 18. For example, the demodulator 20 can provide a gain from the common node terminal CN to the junction of resistors 60 and 32 of say 16 volts DC per volt AC of the voltage EAC. In this example, the control circuit 25 and the oscillator 18 should then provide a gain from the junction of resistors 60 and 32 to the voltage V across the bridge circuit of ⅛ volt AC per volt DC. Thus the product of the two gains is 2 and therefore the portion of voltage V attributable to the voltage EAC is a factor of two greater than the voltage EAC. The closer this product is to 2, the more linear the system will be. Accordingly, if need be, trimpots or other gain adjusting devices can be provided to tailor the gain.

Also, with regard to the circuit values, it should be noted that variations in frequency caused by temperature changes and the like do not cause problems because of the balanced circuit arrangement.

Figure 3:
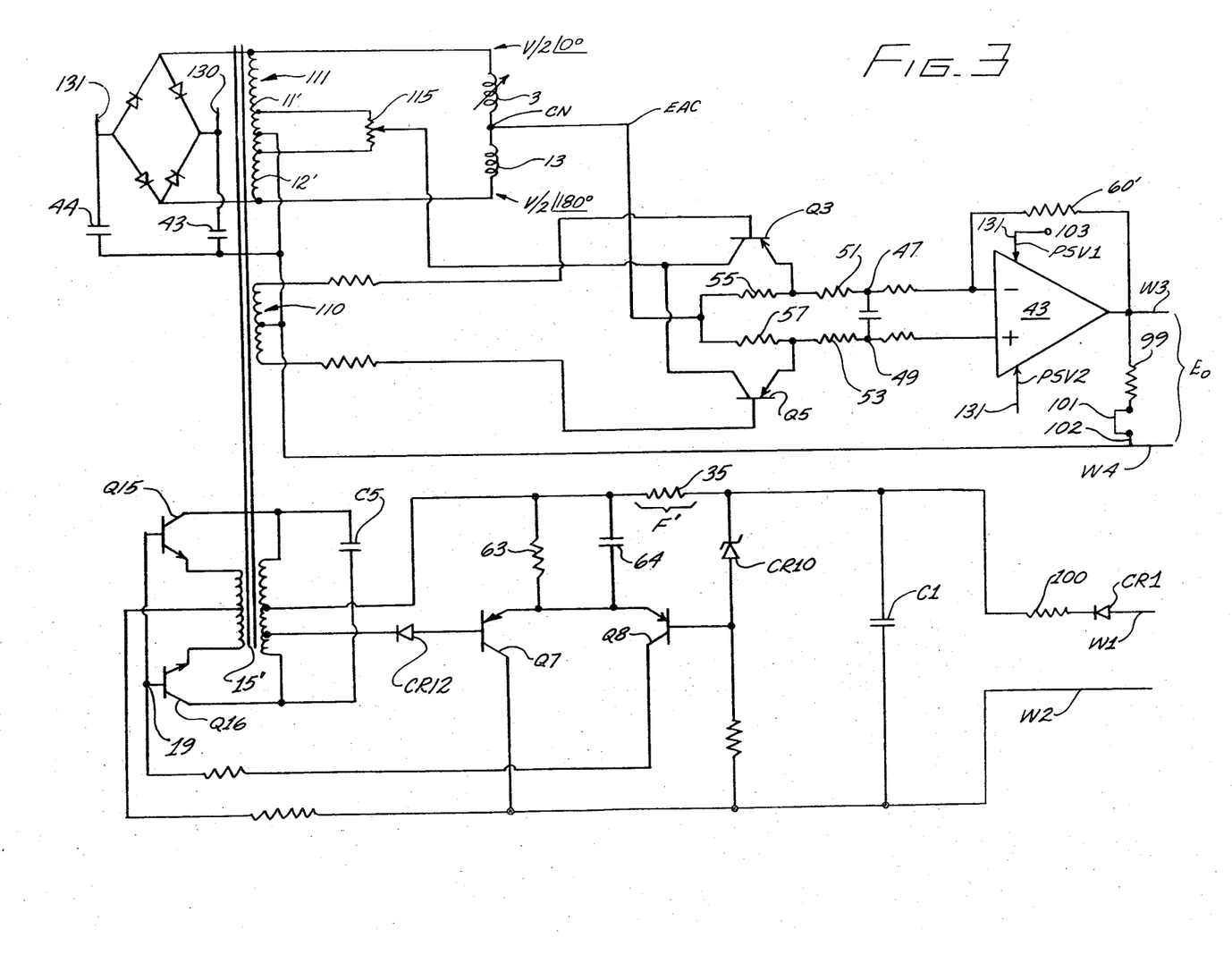
FIG. 3 is an electrical schematic of a second embodiment of this invention.

In FIG. 3 there is shown a second embodiment of this invention. This embodiment is presently preferred for applications other than a two wire system. That is, an output electrical signal is developed which can be used to control an external meter for displaying the information. This is in contrast to the two-wire system wherein the output signal information resides in the amount of current drawn from the two wires that provide supply power.

Also, this second embodiment is particularly advantageous for precision instrumentation in which double-active arm transducer arrangements are used. As described above, double-active arm arrangements such as have been used in the past do not exhibit so significant a non-linearity characteristic as prior art single active arm arrangements. However, even with a double-active arm arrangement there is in a practical device some degree of non-linearity. Moreover, the non-linearity can fall in either of two cases. In one case, the second derivative of the output with respect to the input is positive; in the other case, this second derivative is negative. For ideal linearity, of course, this second derivative should be zero.

The embodiment of FIG. 3 provides even further improvement in linearity and, by a simple wiring change described below, provides for linearization in either of the two above-described cases.

Those circuit elements of the embodiment of FIG. 3 having a counterpart in the embodiment of FIG. 2 have been given like reference numerals.

Thus, an input supply voltage is presented across the two wires W1 and W2. In contrast to the first embodiment, however, an output voltage signal Eo is produced between output wires W3 and W4 and each of these wires is DC isolated from the input wires W1 and W2.

Capacitor C1, resistor 100, and diode CR1 serve as a high frequency filter in the same manner as described with reference to FIG. 2. The junction of capacitor C1 and resistor 100 is connected to the junction of resistor 35 and zener diode CR10. Resistor 35 has a voltage F' developed across it. As will be explained hereafter, the resistor 35 plays substantially the same role as an output signal sensing resistor in a feedback arrangement, even though it is not directly connected to the output signal.

Resistor 35 is a part of a differential amplifier arrangement which in the same manner as described above with reference to FIG. 2 provides control for an amplitude-controllable sine-wave oscillator.

The oscillator in the embodiment of FIG. 3 differs from that of FIG. 2 in that the transformer 15' has additional output windings, 110 and 111. These windings are center-tapped with wire W4 being connected to the center taps. Winding 110 provides the oscillating voltages required to control chopper transistors Q3 and Q5. These chopper transistors are a part of a phase-sensitive demodulator circuit which operates substantially as described above with reference to FIG. 2. The demodulator of FIG. 3 provides improved performance in that phase adjustment is provided. To this end, the collectors of the chopper transistors are connected to the arm of a potentiometer 115. Taps are provided in winding 111 to drive the potentiometer. The voltages PSV1 and PSV2, used as DC supplies for the operational amplifier 43, are obtained from a diode bridge circuit driven by the winding 111. The voltage PSV1 is carried by a signal lead 130 (a part of which is not shown) to the operational amplifier 43. The voltage PSV2 is carried by a signal lead 131 (a part of which is not shown) to the operational amplifier 43.

Winding 111 also provides the voltages $V/2 \angle 0°$ and $V/2 \angle 180°$ that are applied across the elements 3 and 13. The voltage EAC is developed at the junction of these two elements and serves as the input signal to the demodulator in the same manner as described above.

The operational amplifier 43 has its output connected to the wire W3 which in turn is connected to one end of a selected loading resistor 99. The opposite end of resistor 99 is connected to a fixed end of a jumper wire 101. The free end of the jumper wire is connectable to either a strapping terminal 102 or a strapping terminal 103. FIG. 3 shows the jumper wire connected to strapping terminal 102 whereby the resistor 99 is connected in series between the output of the operational amplifier 43 and the wire W4. By simply reconnecting the free end of the jumper wire 101 to the strapping terminal 103 the resistor 99 can be connected in series between the signal lead 130, which carries PSV1, and the output of the operational amplifier 43.

The sole source of power for the embodiment of FIG. 3 is presented across the wires W1 and W2. Accordingly, whenever the output signal Eo changes in such a way as to demand more current, then additional source current $I_s$ flows. The additional source current, or at least a substantial part of it, flows directly through the resistor 35. This of course changes the value of the voltage F', which in turn, as described above with reference to FIG. 2, changes the amplitude of the output of the sine-wave oscillator. With the jumper wire 101 connected as shown, any increase in the output voltage Eo causes an increase in the current flowing through the resistor 99. This demand for more current causes an increase in the source current and a consequent change in oscillator amplitude. From the foregoing it will be appreciated that the voltage F' increases in magnitude as the output signal Eo increases in magnitude and thereby performs substantially the same control function as a feedback signal. With the jumper wire connected as shown, this control leads to linearization for the case in which the second derivative is positive.

To effect linearization in the other case, jumper wire 101 is reconnected to connect resistor 99 in series between the signal lead 130 and the output of the operational amplifier 43. With the jumper wire connected this way, even when the output signal Eo is 0 volts, there will be a current flowing through resistor 99. In this circumstance the operational amplifier acts as a sink rather than as a source for current. As the output signal increases toward the voltage level of PSV1 there will be less current flowing through the resistor 99. Accordingly, with less demand for current, there is a decrease in the source current. With a decrease in the source current there is a decrease in the voltage F' and a consequent change in oscillator output. From the foregoing it will again be appreciated that the voltage F', decreasing as it does here with increases in the magnitude of the output signal Eo, performs substantially the same function as a feedback signal.

While this invention has been particularly described with respect to its preferred embodiments, it should be noted that other arrangements are possible that are based on the underlying concept of this invention.

For example, transducing means are known which form a variable capacitance element, the capacitance of which is reciprocally related to variations in a physical parameter such as pressure, temperature, and the like. A network including such a variable capacitance and a series-connected fixed impedance has a non-linear input-to-output voltage-signal transmission characteristic that is functionally related to variations in the physical parameter in the same manner as the single-active-arm variable-reluctance pressure transducer. A circuit arrangement can be provided to apply across the network an input signal comprising a reference portion and a feedback portion, the feedback portion varying in accordance with the output signal of the network. With the appropriate feedback gain, the input signal varies in magnitude such that the voltage existing across the fixed impedance has a predetermined magnitude that is substantially unaffected by variations in the variable capacitance or the output signal, and the output signal varies linearly with variations in the physical parameter.

I claim:

1. A transducer system comprising:
   transducing means sensing a variable physical parameter and forming a variable impedance element having an impedance which varies as a function of variations in the physical parameter;
   a network including an impedance element connected in series circuit relationship with the variable impedance element, the network having a pair of terminals for receiving an input voltage signal, means including at least one additional terminal for providing an output voltage signal, and having an input-to-output voltage signal transmission characteristic which, for any fixed magnitude input voltage signal, is a non-linear function of variations in the physical parameter;
   means for substantially linearizing the output voltage signal with respect to variations in the physical parameter which comprises
   a source of a reference signal;
   circuit means responsive to the reference signal and the output voltage signal for applying to the pair of terminals a variable magnitude input voltage signal of such a magnitude that the voltage signal developed across one of the impedance elements has a predetermined magnitude that is substantially unaffected by variations in either the impedance of the variable impedance element or the output voltage signal; and
   the series circuit thereby having a current flowing through it that develops across the other impedance element a voltage that is substantially linearly proportional to variations in the physical parameter.

2. A system according to claim 1 wherein the transducing means comprises a variable-reluctance pressure transducer forming a variable inductor, and wherein the circuit means applies a substantially constant-frequency oscillating voltage signal as an input signal to the network, and an oscillating current flows through the variable inductor which current has a variable magnitude substantially linearly proportional to change in pressure.

3. A system according to claim 2 wherein the circuit means includes a center-tapped transformer winding connected to the network to define a bridge network so that a null output voltage signal is produced at a reference pressure.

4. A transducer system comprising:
   transducing means sensing a variable physical parameter and forming a variable reactance element having two terminals and having an impedance which varies as a reciprocal function of variations in the physical parameter:
   a source of a reference signal;
   first circuit means coupled to the variable reactance element and providing an indicating signal;
   second circuit means responsive to the reference signal and applying across the two terminals a voltage signal having a predetermined magnitude that is substantially unaffected by variations in either the impedance of the variable reactance element or the indicating signal, whereby current flowing through the variable reactance element varies in a substantially linear relationship with the physical parameter; and
   the indicating signal provided by the first circuit means being substantially linearly proportional to the current flowing through the variable reactance element.

5. A transducer system comprising:
   a variable reluctance pressure transducer forming a variable inductor having two terminals and having an impedance which varies as a reciprocal function of variations in ambient pressure;
   a source of a reference signal;
   first circuit means coupled to the variable inductor and providing an indicating signal;
   second circuit means responsive to the reference signal and applying across the two terminals a voltage signal having a predetermined magnitude that is substantially unaffected by variations in either the impedance of the variable inductor or the indicating signal, whereby current flowing through the variable inductor varies in a substantially linear relationship with the physical parameter; and
   the indicating signal provided by the first circuit means being substantially linearly proportional to the current flowing through the variable inductor.

6. A system according to claim 5 wherein the second circuit means applies a substantially constant-frequency, constant-amplitude oscillating voltage signal across the two terminals, whereby an oscillating current flows through the variable inductor which current has a variable magnitude substantially linearly proportional to change in pressure.

7. A system according to claim 6 wherein the first circuit means includes a demodulator circuit providing a D.C. signal proportional to the magnitude of the oscillating current flowing through the variable inductor.

8. A system according to claim 5 wherein the second circuit means includes a fixed inductor in series circuit relationship with the variable inductor; a controllable oscillator circuit providing an oscillating signal having an amplitude which is determined by a control signal received by the oscillator circuit; circuit means coupling the oscillator circuit to the series circuit formed by the variable and fixed inductors; the demodulator circuit being responsive to an oscillating voltage developed in the series circuit and providing a feedback signal; and means for combining the feedback signal with the reference signal to form the control signal.

9. A system according to claim 8 wherein the circuit means coupling the oscillator circuit to the series circuit includes a first terminal coupled to one terminal of the variable inductor, a second terminal coupled to one terminal of the fixed inductor, and a third terminal coupled to a substantially constant potential, and means providing equal magnitude and oppositely phased oscillating voltages to the first and third terminals, whereby the oscillating voltage developed in the series circuit has a null relative to the constant potential at a predetermined reference pressure.

10. A system according to claim 9 wherein the demodulator circuit is a phase-sensitive demodulator responsive to the phase of the oscillating voltage developed in the series circuit.

* * * * *

UNITED STATES PATENT OFFICE
CERTIFICATE OF CORRECTION

Patent No. 3,837,227                     Dated September 24, 1974

Inventor(s) John R. Tavis

It is certified that error appears in the above-identified patent and that said Letters Patent are hereby corrected as shown below:

Column 2, line 41, equation should read as follows:
-- $(0.028 - 0.026)/(0.055) = 3.6\%$ F.S.--

Column 5, line 55, equation should read as follows:
-- $V_T = V[g_o/(2g_o - \Delta g_o)]$ --

Column 5, line 67, equation should read as follows:
-- $EAC = [-V(\Delta g_o)]/[4g_o - 2\Delta g_o]$ --

Signed and sealed this 17th day of December 1974.

(SEAL)
Attest:

McCOY M. GIBSON JR.
Attesting Officer

C. MARSHALL DANN
Commissioner of Patents